United States Patent
Hwang et al.

(10) Patent No.: US 11,115,738 B1
(45) Date of Patent: Sep. 7, 2021

(54) BANDWIDTH ALLOCATION APPARATUS FOR USE IN OVERSUBSCRIPTION NETWORK SWITCHING AND RELATED NETWORK SWITCH

(71) Applicant: Realtek Semiconductor Corp., HsinChu (TW)

(72) Inventors: Chen-Kuo Hwang, HsinChu (TW); Yung-Chang Lin, HsinChu (TW); Chih-Hao Wang, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 16/877,450

(22) Filed: May 18, 2020

(30) Foreign Application Priority Data

Feb. 14, 2020 (TW) .................................. 109104697

(51) Int. Cl.
| | |
|---|---|
| *H04Q 11/04* | (2006.01) |
| *H04W 72/12* | (2009.01) |
| *H04W 72/04* | (2009.01) |
| *H04L 12/873* | (2013.01) |
| *H04L 12/54* | (2013.01) |
| *H04L 12/863* | (2013.01) |
| *H04L 12/70* | (2013.01) |

(52) U.S. Cl.
CPC ..... *H04Q 11/0478* (2013.01); *H04L 12/5602* (2013.01); *H04L 47/50* (2013.01); *H04L 2012/5632* (2013.01); *H04L 2012/5679* (2013.01)

(58) Field of Classification Search
CPC .. H04L 12/5602; H04L 47/50; H04Q 11/0478
See application file for complete search history.

(56) References Cited

U.S. PATENT DOCUMENTS

| | | | | |
|---|---|---|---|---|
| 5,241,536 A | * | 8/1993 | Grimble ............. | H04L 12/5601 370/398 |
| 6,628,609 B2 | * | 9/2003 | Chapman ........... | H04L 41/0896 370/229 |
| 6,687,781 B2 | * | 2/2004 | Wynne ................. | H04L 47/525 370/229 |
| 7,072,353 B2 | * | 7/2006 | Smiljanic ............ | H04L 49/105 370/442 |
| 7,916,638 B2 | * | 3/2011 | Lim .................... | H04L 47/6215 370/235 |

(Continued)

*Primary Examiner* — Rasheed Gidado
(74) *Attorney, Agent, or Firm* — Winston Hsu

(57) ABSTRACT

A bandwidth allocation device includes a buffer device, a main scheduler, an oversubscription scheduler, a multiplexer and a detecting device. The buffer device is arranged to receive first data units from first ports and second data units from second ports and accordingly output these data units. The main scheduler is configured to schedule the first data units and accordingly output the first data units in sequence. The oversubscription scheduler is configured to schedule the second data units and accordingly output the second data units in sequence. The multiplexer is controlled by the main scheduler to select the first data units outputted by the main scheduler and the second data units outputted by the oversubscription scheduler for outputting. The detecting device is arranged to generate power-related information which the main scheduler relies on to control the multiplexer.

16 Claims, 2 Drawing Sheets

(56) References Cited

U.S. PATENT DOCUMENTS 8,369,219 B2 * 2/2013 Acharya .............. H04J 3/0632
370/235
10,862,818 B2 * 12/2020 Senarath ........... H04W 72/1257

* cited by examiner

BANDWIDTH ALLOCATION APPARATUS FOR USE IN OVERSUBSCRIPTION NETWORK SWITCHING AND RELATED NETWORK SWITCH

BACKGROUND OF THE INVENTION

1. Field of the Invention

The present invention relates to oversubscription network switches, and more particularly, to a bandwidth allocation device and a network switch that dynamically allocate bandwidth based on hardware temperature as well as bandwidth utilization.

2. Description of the Prior Art

A network switch is networking hardware that provides information exchange and data forwarding services to networked devices. Nowadays, output/input bandwidth of networked devices is getting larger and larger. In order to meet overall bandwidth requirements, it is inventible to increase core routing bandwidth of a network switch. However, if the core routing bandwidth is increased, system operating frequency will accordingly increase, which may eventually cause timing convergence problems to system design. Therefore, there is an oversubscription design in the conventional art. Under such design, a network switch is allowed to have a core routing bandwidth that is much smaller than an overall bandwidth required by networked devices it serves. Such network switch serves the networked devices through a bandwidth allocation mechanism.

In an oversubscription network switch, ports are categorized into line rate ports and oversubscription ports. For line rate ports, the system must allocate sufficient core routing time slots to serve the networks devices on these ports to ensure that overall bandwidth requirements are fully met. For the oversubscription port, the system will use the remaining core routing time slots and idle time slots to serve the networked devices on these ports.

The oversubscription ports are only allowed to use the remaining part of the core routing bandwidth after the bandwidth has been used by the line rate ports. Therefore, how to efficiently allocate the bandwidth has become an important issue in the design of oversubscription network switches. The design concept of the existing oversubscription network switches is to use core routing bandwidth as much as possible, thereby to achieve the best performance. However, overly increasing the system operating frequency to chase the maximum performance will increase the power consumption of the system, causing hardware temperature too high and chip malfunction or even damaging the chip. Ultimately, it may affect the stability of the system.

SUMMARY OF THE INVENTION

With this in mind, it is one object of the present invention to provide a bandwidth allocation mechanism for use in an oversubscription network switch. The bandwidth allocation mechanism of the present invention allows the oversubscription network switch to allocate the bandwidth according to maximum data transmission rate as well as actual transmission rate limits of the networked devices, thereby to improve core routing bandwidth utilization. In addition, the bandwidth allocation mechanism of the present invention also considers the system power and accordingly decides whether to adjust the core routing bandwidth based on hardware temperature or voltage changes, thereby reducing the risk of overheating and achieving a balance between power consumption and performance.

According to one embodiment of the present invention, a bandwidth allocation device for use in a network switch is provided. The bandwidth allocation device comprises: a buffer device, a buffer device, a main scheduler, an oversubscription scheduler, a multiplexer, a rate measurement device and a detection device. The buffer device is configured to receive a plurality of first data units that are transmitted from a plurality of first ports and a plurality of second data units that are transmitted from a plurality of second ports, and accordingly output the first and second data units. The main scheduler is coupled to the buffer device and configured to schedule the first data units and accordingly output the first data units in sequence. The oversubscription scheduler is coupled to the buffer device and configured to schedule the second data units and accordingly output the second data units in sequence. The multiplexer is coupled to the main scheduler and the oversubscription scheduler, and controlled by the main scheduler to select from the first data units outputted by the main scheduler and the second data units outputted by the oversubscription scheduler to output. The detection device is configured to generate power-related information, wherein the main scheduler is configured to control the multiplexer according to the power-related information. The rate measurement device is configured to measure data transmission rates corresponding to the first and second ports to generate data transmission rate information. The main scheduler is configured to control the multiplexer according to the data transmission rate information and the oversubscription scheduler is configured to schedule the second data units according to the data transmission rate information.

According to one embodiment of the present invention, a network switch is provided. The network switch comprises a plurality of first ports, a plurality of second ports, an input bandwidth allocation device, a routing device, and an output bandwidth allocation device. The input bandwidth allocation device comprises: a buffer device, a buffer device, a main scheduler, an oversubscription scheduler, a multiplexer, a rate measurement device and a detection device. The buffer device is configured to receive a plurality of first data units that are transmitted from a plurality of first ports and a plurality of second data units that are transmitted from a plurality of second ports, and accordingly output the first and second data units. The main scheduler is coupled to the buffer device and configured to schedule the first data units and accordingly output the first data units in sequence. The oversubscription scheduler is coupled to the buffer device and configured to schedule the second data units and accordingly output the second data units in sequence. The multiplexer is coupled to the main scheduler and the oversubscription scheduler, and controlled by the main scheduler to select from the first data units outputted by the main scheduler and the second data units outputted by the oversubscription scheduler to output. The detection device is configured to generate power-related information, wherein the main scheduler is configured to control the multiplexer according to the power-related information. The rate measurement device is configured to measure data transmission rates corresponding to the first and second ports to generate data transmission rate information. The main scheduler is configured to control the multiplexer according to the data transmission rate information and the oversubscription scheduler is configured to schedule the second data units according to the data transmission rate information. The routing device is coupled to the input scheduling device, and configured to perform a routing process according to the first and second data units outputted by the input bandwidth allocation device. The output bandwidth allocation device is coupled to the routing device, and configured to forward the first data units and the second data units to the first ports and the second ports based on a routing result of the routing device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
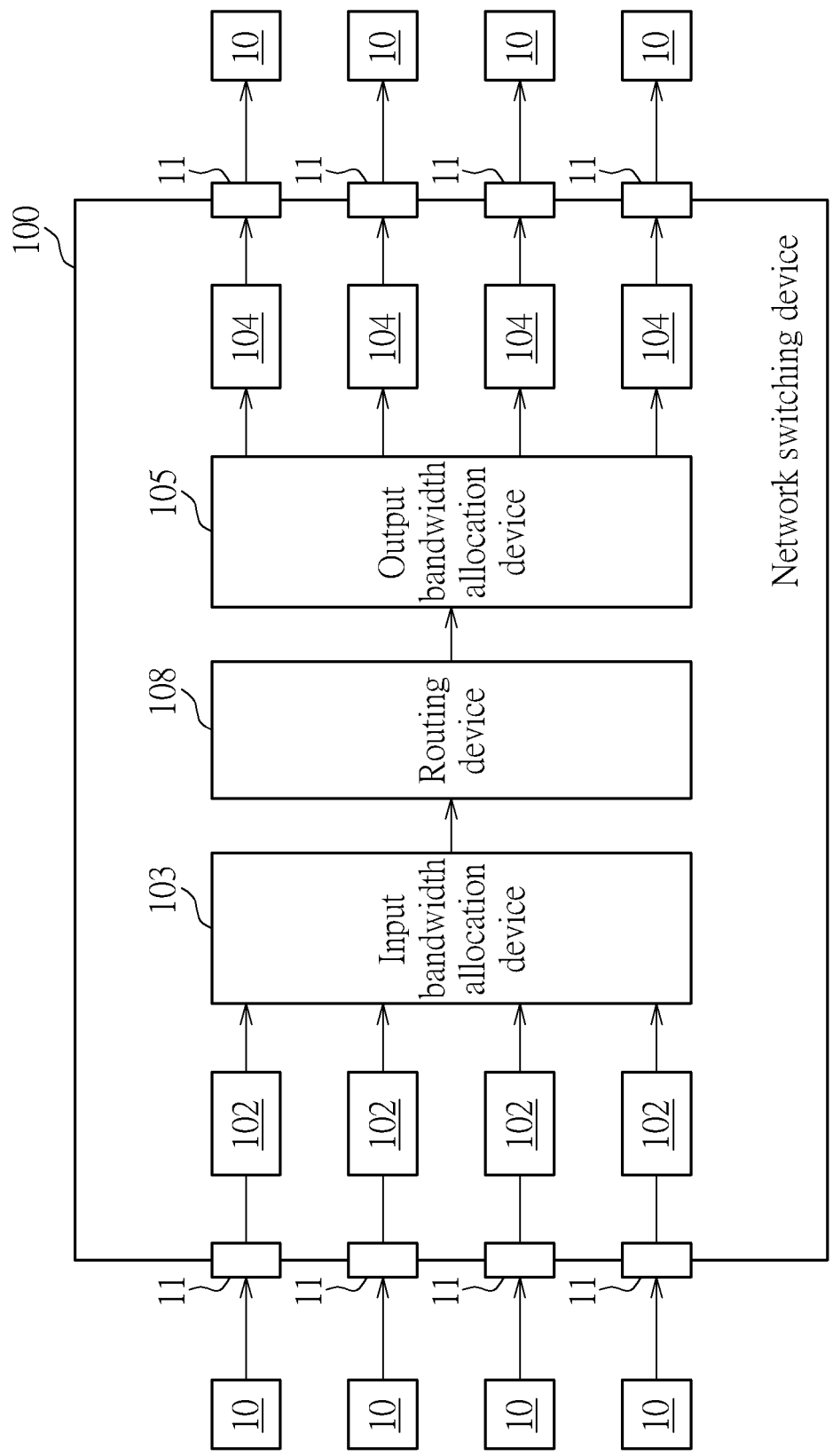
FIG. 1 is a diagram illustrating structure of a network switch according to one embodiment of the present invention.

FIG. 1 is a diagram illustrating structure of a network switch according to one embodiment of the present invention. The network switching device 100 comprises a plurality of ports 11. A plurality of devices 10 are coupled to the network switching device 100 via the ports 11. The network switching device 100 is operable to provide information exchange and data forwarding service to the devices 10. The device 10 could be various electronic devices with network communication capabilities, such as personal computers, laptops, printers, Internet phones, and network storage devices.

The network switching device 100 has oversubscription architecture. The ports 11 comprise line rate ports and oversubscription ports. By allocating core routing bandwidth, the network switching device 100 ensures that a data transmission rate of each device 10 on the line rate ports 11 can reach its maximum input/output bandwidth. In addition, the network switching device 100 allocates a remaining part of the core routing bandwidth to the devices 10 on the oversubscription port 11. The network switching device 100 also comprises a plurality of receiving-end medium access control (MAC) circuits 102, a plurality of transmitting-end MAC circuits 104, an input bandwidth allocation device 103 (e.g. Ingress oversubscription bandwidth manager (OBM)), an output bandwidth allocation device 105 (e.g. Egress OBM) and a routing device 108. Each port 11 is coupled to at least one receiving-end MAC circuit 102 and at least one transmitting-end MAC circuit 104. The receiving-end MAC circuit 102 is employed for receiving data units (e.g. packet) from a source device 10 and performing MAC layer processing on the received data units. The transmitting-end MAC circuit 104 is employed for receiving packets that are outputted from a routing process of the routing device 108 and performing MAC layer processing on these packets, thereby to forward the packets to a target device 10. The routing device 108 is employed for providing packet routing function, which forwards a received packet to a specific transmitting-end MAC circuit 104 according to a target address recorded in the received packet, such that the target device 10 can receive this packet.

To ensure that a device 10 on the line rate port 11 can reach its maximum input/output bandwidth and properly allocate the remaining part of the core routing bandwidth to the devices 10 on the oversubscription ports, the network switching device 100 needs to perform bandwidth management through the input bandwidth allocation device 103. In each time slot, the input bandwidth allocation device 103 determines that the packet from which port 11 can be sent to the routing device 108 for routing processing. Moreover, the output bandwidth allocation device 105 can control the timing that each transmitting-end MAC circuit 104 reads the packets.

Figure 2:
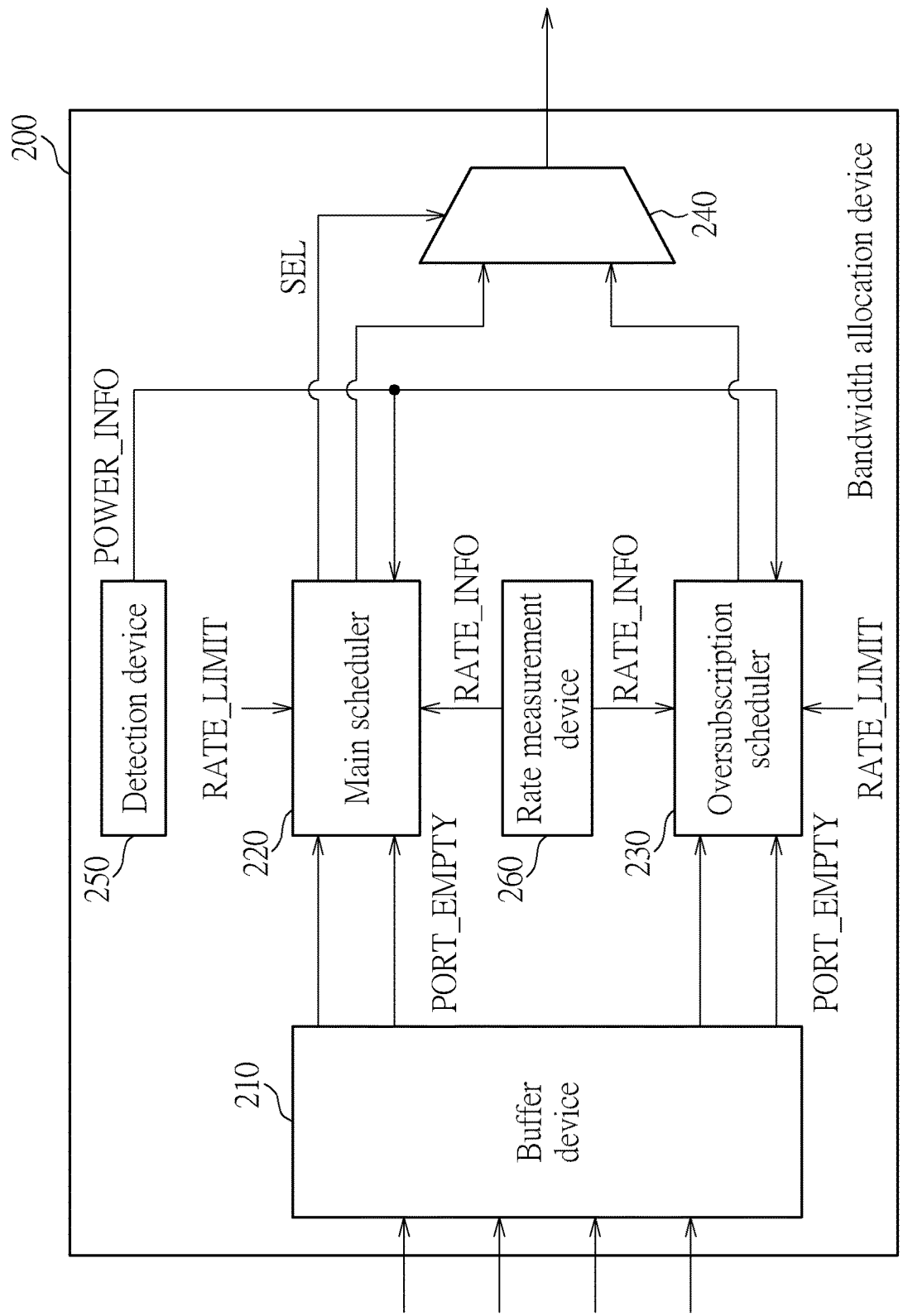
FIG. 2 is a diagram illustrating structure of a bandwidth allocation device according to one embodiment of the present invention.

FIG. 2 is a diagram illustrating structure of a bandwidth allocation device according to one embodiment of the present invention, wherein the illustrated bandwidth allocation device can be used to implement the input bandwidth allocation device 103 or the output bandwidth allocation device 105 of FIG. 1. As illustrated, the bandwidth allocation device 200 comprises a buffer device (e.g. oversubscription absorb memory) 210, a main scheduler 220, an oversubscription scheduler 230, a multiplexer 240, a detection device 250 and a rate measurement device 260. The buffer device 210 is operable to buffer packets from the receiving-end MAC circuits 102. When the packets come from the devices 10 on the line rate ports 11, the buffer device 210 will directly pass these packets to the main scheduler 220 (or buffering these packets with a small buffer memory). When the packets come from the devices 10 on the oversubscription ports 11, as the devices 10 on the oversubscription port 11 has lower priority in using the core routing bandwidth, the buffer device 210 will buffer these packets. These packets will wait for being processed by the oversubscription scheduler 230. In addition, the buffer device 210 also monitors transmission status of the ports 11 and accordingly generates port empty status information PORT_EMPTY to notify the main scheduler 220 and the oversubscription scheduler 230. When a certain port 11 does not transmit the packet to buffer device 210, the buffer device 210 will notify the main scheduler 220 and the oversubscription scheduler 230, thereby to allocate the time slot to the devices 10 on other ports 11.

The main purpose of the main scheduler 220 is to allocate bandwidth to the line rate ports 11, which mainly sets weighting factors based on the maximum output/input bandwidth of the device 10 on each line rate ports 11, thereby to ensure each line rate port 11 can adequately use the core routing bandwidth. Specifically, the main scheduler 220 schedules the packets that are planned to be transmitted to the routing device 108, thereby to sequentially transmit the packets in each time slot. On the other hand, the main scheduler 220 will also restrict the use of core routing bandwidth by devices 10 on oversubscription ports 11 based on the overall bandwidth requirements of line rate ports 11. The main scheduler 220 relies on a multiplexer control signal SEL to control the multiplexer 240. When the bandwidth allocation device 200 serves the devices 10 on the line rate ports 11, the multiplexer control signal SEL allows multiplexer 240 to output the packets provided by the main scheduler 220, such that the routing device 108 can perform routing processing on the packets that are transmitted from the devices on the line rate ports 10. However, if the main scheduler 220 is notified by the port empty state information PORT_EMPTY that a device 10 on the line rate port 11 which an instant time slot is allocated to does not need to transmit the packet, the main scheduler 220 will give the instant time slot to the devices 10 on the oversubscription ports 11. At this time, the multiplexer control signal SEL allows the multiplexer 240 to output the packet provided by the oversubscription scheduler 230.

The purpose of the oversubscription scheduler 230 is to allocate the remaining part of the core routing bandwidth to the devices 10 on the oversubscription port 11. Typically, the oversubscription scheduler 230 also sets a weighting factor for each device 10 on the oversubscription ports 11 according to the maximum input/output bandwidth of individual devices 10 on the oversubscription ports 11, thereby to allocate the use of the core routing bandwidth for the oversubscription ports 11. Further, the oversubscription scheduler 230 is also configured to schedule the packets that are planned to be transmitted to the routing device 108, thereby to sequentially assign the transmission of the packet in the time slots given by the main scheduler 220.

For improving of the utilization of the core routing bandwidth, the bandwidth allocation mechanism of the present invention further refers to the data transmission rate information RATE_INFO regarding each port 11 that is generated by the rate measurement device 260 as well as the transmission rate limit RATE_LIMIT that is applied to each port 11, to allocate the bandwidth. Specifically, in order to avoid a device 10 taking up too much bandwidth, the network switching device 100 could add specific transmission rate limits to each port 11. Once the data transmission rate regarding a port 11 reaches the transmission rate limit RATE_LIMIT, the network switching device 100 will stop providing the packet exchange service to this port.

In the bandwidth allocation mechanism of the present invention, as long as one of the following conditions is satisfied, the main scheduler 220 will give a part of the core routing bandwidth to the oversubscription scheduler 230 through the control over the multiplexer 240:

1. Line rate port 11 has no need for packet transmission (by referring to the port empty state information PORT_EMPTY); and 2. The data transmission rate of line rate port 11 reaches a transmission rate limit (by referring to the data transmission rate information RATE_INFO and the transmission rate limit RATE_LIMIT).

On the other hand, only when the following conditions are satisfied at the same time, the oversubscription scheduler 230 allows a packet sent by a specific oversubscription port 11 to be placed in the schedule:

1. Oversubscription port 11 has a need for packet transmission (by referring to the port empty state information PORT_EMPTY); and 2. The data transmission rate of oversubscription port 11 dose not reach a transmission rate limit (by referring to the data transmission rate information RATE_INFO and transmission rate limit RATE_LIMIT).

Furthermore, in the bandwidth allocation mechanism of the present invention, when the main scheduler 220 allocates a part of the core routing bandwidth to the devices 10 of the oversubscription ports 11, it also takes the power-related detection result into consideration. According to the power-related detection result POWER_INFO outputted by the detection device 250, the main scheduler 220 determines whether or not to allocate a part of the core routing bandwidth to the oversubscription ports 11. According to various embodiments, the detection device 250 could be any type of temperature sensor or any type of voltage detectors. When the detection device 250 is a temperature sensor, it can detect whether or not hardware temperature (e.g., hardware temperature of the network switching device 100, the bandwidth allocation device 200 or the oversubscription port 11) is too high. Accordingly, once the main scheduler 220 acknowledges that the temperature is too high according to the detection result POWER_INFO, the main scheduler 220 can reduce the part of the core routing bandwidth that is allocated to the oversubscription ports 11 through the control over the multiplexer 240. In one embodiment, the hardware temperature can be divided into several levels. The higher the level, the more the main scheduler 220 reduces the part of the core routing bandwidth that can be used by the devices 10 on oversubscription ports 11. For example, through the control over the multiplexer 240, the main scheduler 220 can adjust the packet output of the oversubscription scheduler 230 over a period of time according to the temperature level.

In addition, the rise in the hardware temperature is associated with load of the network switching device 100. When the load is larger, it also means that the power supply voltage may drop. Therefore, if the detection device 250 is a voltage sensor, the detection device 250 can determine whether the hardware is in an overloaded state by measuring the IR drop of the power supply voltage. Once the main scheduler 220 determines the hardware is overloaded based on the detection result POWER_INFO, the main scheduler 220 can reduce the part of the core routing bandwidth that is allocated to the oversubscription ports 11 through the control over the multiplexer 240. In one embodiment, the IR drop can be divided into several levels. The higher the level, the more the main scheduler 220 reduces the part of the core routing bandwidth that can be used by the devices 10 on oversubscription ports 11. For example, through the control over the multiplexer 240, the main scheduler 220 can adjust the packet output of the oversubscription scheduler 230 over a period of time according to the IR drop level.

In conventional oversubscription network switching architecture, core routing bandwidth is allocated typically according to weighting factors that are determined by maximum input/output bandwidth of each oversubscription port. However, in real applications, users often place additional restrictions, such as, transmission rate limitation, on different ports. In the bandwidth allocation mechanism of the present invention, individual maximum input/output bandwidths of the oversubscription ports as well as actual data transmission rates are therefore taken into consideration for bandwidth allocation.

Thus, the bandwidth allocation mechanism of the present invention can increase the probability that the line rate ports give a part of the core routing bandwidth to the oversubscription port. In addition, by restricting the oversubscription ports that are allowed to be scheduled, the core routing bandwidth can be allocated more reasonably, such that the oversubscription ports that have needs of packet transmission can be allocated more sufficient bandwidth, thereby improving the core routing utilization.

On the other hand, in consideration of chasing maximum performance, the conventional oversubscription architecture often uses the core routing bandwidth indiscriminately, which allocates the remaining part of the core routing bandwidth after used by the line rate ports to the oversubscription ports as much as possible. In contrast, the present invention takes the impact of high dynamic power consumption caused by increasing the utilization of the core routing bandwidth into consideration, such as hardware overheating. Therefore, the bandwidth allocation mechanism of the present invention dynamically adjusts how the oversubscription ports use the core routing bandwidth through power-related detection, thereby reducing power consumption and temperature to ensure system stability.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A bandwidth allocation device for use in a network switch, comprising:
   a buffer device, configured to receive a plurality of first data units that are transmitted from a plurality of first ports and a plurality of second data units that are transmitted from a plurality of second ports, and accordingly output the first and second data units;
   a main scheduler, coupled to the buffer device, configured to schedule the first data units and accordingly output the first data units in sequence;
   an oversubscription scheduler, coupled to the buffer device, configured to schedule the second data units and accordingly output the second data units in sequence;
   a multiplexer, coupled to the main scheduler and the oversubscription scheduler, controlled by the main scheduler to select from the first data units outputted by the main scheduler and the second data units outputted by the oversubscription scheduler to output;
   a detection device, configured to generate power-related information, wherein the main scheduler is configured to control the multiplexer according to the power-related information; and
   a rate measurement device, configured to measure data transmission rates corresponding to the first and second ports to generate data transmission rate information;
   wherein the main scheduler is configured to control the multiplexer according to the data transmission rate information and the oversubscription scheduler is configured to schedule the second data units according to the data transmission rate information.

2. The bandwidth allocation device of claim 1, wherein when the data transmission rate information indicates a data transmission rate corresponding to a specific first port reaches a transmission rate limit or no first data unit is transmitted to the buffer device through the specific first port, the main scheduler is configured to control the multiplexer to output one of the second data units.

3. The bandwidth allocation device of claim 1, wherein only when the data transmission rate information indicates a data transmission rate corresponding to a specific second port does not reach a transmission rate limit and a second data unit is transmitted to the buffer device through the specific second port, the oversubscription scheduler is configured to place the second data unit transmitted through the specific second port in schedule.

4. The bandwidth allocation device of claim 1, wherein the detection device comprises a temperature detector that is configured to detect a temperature regarding hardware of at least one of the second ports, thereby to generate the power-related information.

5. The bandwidth allocation device of claim 4, wherein the main scheduler is configured to control the multiplexer according to a plurality of levels of the temperature.

6. The bandwidth allocation device of claim 1, wherein the detection device comprises a voltage detector, which is configured to detect a voltage regarding hardware of at least one of the second ports, thereby to generate the power-related information.

7. The bandwidth allocation device of claim 6, wherein the main scheduler control the multiplexer according to a plurality of levels of the voltage.

8. The bandwidth allocation device of claim 1, wherein the oversubscription scheduler is configured to schedule the second data units according to the power-related information.

9. A network switching device, comprising:
   a plurality of first ports;
   a plurality of second ports;
   an input bandwidth allocation device, comprising:
      a buffer device, configured to receive a plurality of first data units that are transmitted from a plurality of first ports and a plurality of second data units that are transmitted from a plurality of second ports, and accordingly output the first and second data units;
      a main scheduler, coupled to the buffer device, configured to schedule the first data units and accordingly output the first data units in sequence;
      an oversubscription scheduler, coupled to the buffer device, configured to schedule the second data units and accordingly output the second data units in sequence;
      a multiplexer, coupled to the main scheduler and the oversubscription scheduler, controlled by the main scheduler to select from the first data units outputted by the main scheduler and the second data units outputted by the oversubscription scheduler to output;
      a detection device, configured to generate power-related information, wherein the main scheduler is configured to control the multiplexer according to the power-related information;
      a rate measurement device, configured to measure data transmission rates corresponding to the first and second ports to generate data transmission rate information, wherein the main scheduler is configured to control the multiplexer according to the data transmission rate information and the oversubscription scheduler is configured to schedule the second data units according to the data transmission rate information; and
   a routing device, coupled to the input scheduling device, configured to perform a routing process according to the first and second data units outputted by the input bandwidth allocation device; and
   an output bandwidth allocation device, coupled to the routing device, configured to forward the first data units and the second data units to the first ports and the second ports based on a routing result of the routing device.

10. The network switching device of claim 9, wherein when the data transmission rate information indicates a data transmission rate corresponding to a specific first port reaches a transmission rate limit or no first data unit is transmitted to the buffer device through the specific first port, the main scheduler is configured to control the multiplexer to output one of the second data units.

11. The network switching device of claim 9, wherein only when the data transmission rate information indicates a data transmission rate corresponding to a specific second port does not reach a transmission rate limit and a second data unit is transmitted to the buffer device through the specific second port, the oversubscription scheduler is configured to place the second data unit transmitted through the specific second port in schedule.

12. The network switching device of claim 9, wherein the detection device comprises a temperature detector that is configured to detect a temperature regarding hardware of at least one of the second ports, thereby to generate the power-related information.

13. The network switching device of claim 12, wherein the main scheduler is configured to control the multiplexer according to a plurality of levels of the temperature.

14. The network switching device of claim 9, wherein the detection device comprises a voltage detector that is configured to detect a voltage regarding hardware of at least one of the second ports, thereby to generate the power-related information.

15. The network switching device of claim 14, wherein the main scheduler is configured to control the multiplexer according to a plurality of levels of the voltage.

16. The network switching device of claim 9, wherein the oversubscription scheduler is configured to schedule the second data units according to the power-related information.

* * * * *